United States Patent
Wu et al.

(10) Patent No.: US 8,118,960 B2
(45) Date of Patent: Feb. 21, 2012

(54) METHOD FOR FORMING AN EMBOSSED HOLOGRAPHIC PATTERN

(75) Inventors: Bo Wu, Shenzhen (CN); Qiming Jin, Shenzhen (CN); Qing Gong, Shenzhen (CN)

(73) Assignee: BYD Co., Ltd., Shenzhen (CN)

( * ) Notice: Subject to any disclaimer, the term of this patent is extended or adjusted under 35 U.S.C. 154(b) by 211 days.

(21) Appl. No.: 12/301,185

(22) PCT Filed: Dec. 5, 2007

(86) PCT No.: PCT/CN2007/071181
§ 371 (c)(1),
(2), (4) Date: Nov. 17, 2008

(87) PCT Pub. No.: WO2008/071114
PCT Pub. Date: Jun. 19, 2008

(65) Prior Publication Data
US 2010/0000668 A1 Jan. 7, 2010

(30) Foreign Application Priority Data
Dec. 12, 2006 (CN) .......................... 2006 1 0157479

(51) Int. Cl.
B32B 37/02 (2006.01)
B41M 5/025 (2006.01)
B01J 19/08 (2006.01)

(52) U.S. Cl. .......................... 156/230; 427/145; 427/457

(58) Field of Classification Search .................. None
See application file for complete search history.

(56) References Cited

U.S. PATENT DOCUMENTS
6,120,394 A * 9/2000 Kametani ..................... 473/378
2007/0087171 A1* 4/2007 Hikasa et al. ............... 428/195.1

FOREIGN PATENT DOCUMENTS
| CN | 1084448 A | 3/1994 |
| CN | 2180490 Y | 10/1994 |
| CN | 1317730 A | 10/2001 |
| CN | 1382590 A | 12/2002 |
| CN | 1812890 A | 8/2006 |
| JP | 2001-328398 | 11/2001 |
| WO | WO 2004/108434 A1 | 12/2004 |

OTHER PUBLICATIONS

Songqing Jin, 'Three-dimensional surface water transfer printing technology', Screen Printing Industry, Mar. 2006.
Yong Yang, 'Three-dimensional surface water transfer process', Screen Printing, Jun. 2006.

* cited by examiner

*Primary Examiner* — Philip Tucker
*Assistant Examiner* — Vicki Wu
(74) *Attorney, Agent, or Firm* — Brinks Hofer Gilson & Lione

(57) ABSTRACT

A method for forming an embossed holographic pattern comprises the following steps: A. recording the required pattern onto a photo-sensitive plate by means of laser holography to produce an optical mask plate for the holographic pattern; B. duplicating the laser holographic information on the optical mask plate onto a metal plate, to produce a metal plate for the holographic pattern; C. transferring the laser holographic pattern on the metal plate onto an information layer on a water soluble film, to form an embossed holographic water transfer printing film; D. carrying out a cubic water transfer printing on the surface of a base material by using the embossed holographic water transfer printing film, to form the holographic pattern on the surface of the base material. With the method for forming the embossed holographic pattern according to the present invention, a holographic pattern can be formed on the surface of work-piece having a complex shape.

27 Claims, 5 Drawing Sheets

Fig. 4B ⇩ Laminating and releasing
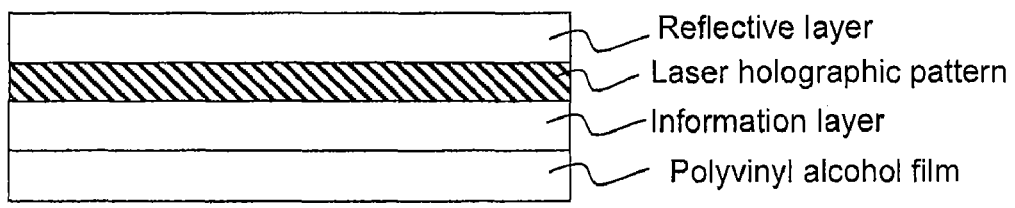
⇩ Cubic water transfer printing
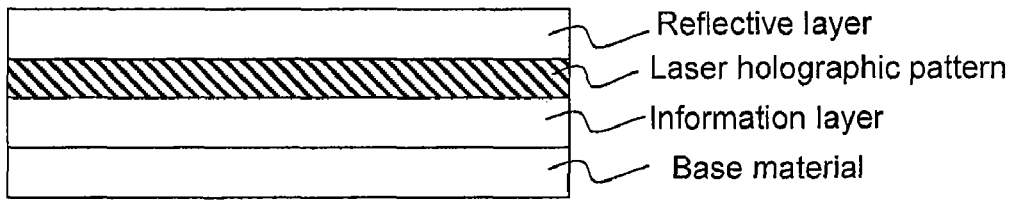
⇩ Coating
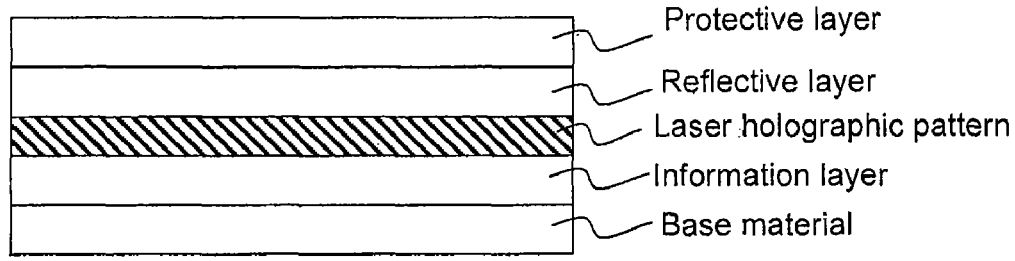

METHOD FOR FORMING AN EMBOSSED HOLOGRAPHIC PATTERN

The present application is the national phase application of PCT Application No. PCT/CN2007/071181, filed Dec. 5, 2007, which claims priority to Chinese Patent Application No. 200610157479.5, filed Dec. 12, 2006, the entireties of both of which are hereby incorporated by references.

FIELD OF THE INVENTION

The present invention relates to a method for forming an embossed holographic pattern.

BACKGROUND OF THE INVENTION

Holographic technique has unique features including good three-dimensional effect, brilliant colors, and dynamic periscopic effect, etc., and therefore has drawn great concern since it emerged. Along with the development of holographic technique, the embossing holographic technique, which involves many fields, such as optics, electronic mechanics, surface chemistry, art, and embossing printing, etc., emerges. Embossed holographic products have advantages including unique functionality, low price, automatic mass production, and wide applicability, etc., and are mainly used for anti-counterfeiting, decoration and packaging, such as laser holographic film, laser holographic paper, etc. A holographic pattern can be transferred or bonded to the surface of a workpiece by using the laser holographic film or laser holographic paper, so as to achieve anti-counterfeiting and decoration functions. For example, CN2180490Y discloses a decorative laser plastic board obtained by bonding a laser holographic film to a plastic plate with a bonding agent. CN1084448A discloses a process in which a holographic pattern is transferred onto a secondary substrate made of a special high molecular material (e.g., silicone rubber), and then the secondary substrate is used as a flexible die to duplicate the holographic information layer onto a resin film on an object (e.g., plastic material or metal material) to form a laser decorative material.

On one hand, forming the hologram directly onto inner and outer surface of object such as cell phone or large three-dimensional parts (e.g., dashboard, bumper car, bumper shield plate, roof, and hood shield of car or truck) can substitute after-molding painting, printing, hot punching or chromeplating process which will eliminate the cost of secondary processing, and reduce the cost of coating line and pollution of organic solvents to the environment; on the other hand it can decorate the surface with good 3-D effect, brilliant colors, and dynamic periscopic effect, which will increase the value of the commodity greatly, attract the customers, and deliver great commercial value, especially for IT parts and automobile industries.

However, the current embossed holographic pattern transfer technique cannot form a holographic pattern on the surfaces of 3-D base materials having a complex shape.

SUMMARY OF THE INVENTION

In order to overcome the problem of forming holographic patterns on the surfaces of 3-D base materials with a complex shape, the present invention provides a method for forming an embossed holographic pattern.

The method for forming an embossed holographic pattern according to the present invention comprises the following steps: A. recording the required pattern onto a photo-sensitive plate by means of laser holography to produce an optical mask plate for the holographic pattern; B. duplicating the laser holographic information on the optical mask plate onto a metal plate, to produce a metal plate for the holographic pattern; C. transferring the laser holographic pattern on the metal plate onto an information layer on a water soluble film, to form an embossed holographic water transfer printing film; D. carrying out a cubic water transfer printing on the surface of a base material by using the embossed holographic water transfer printing film, to form the holographic pattern on the surface of the base material.

In the present invention, after the holographic pattern is formed on the surface of the base material, the method provided in the present invention further comprises the following step: E. forming a protective layer on the surface of the base material, such that the holographic pattern can be protected from abrasion.

Said protective layer has a thickness of 0.01 µm to 100 µm. Said protective layer can be formed by coating an acrylic acid and/or unsaturated polyester UV coating material on the surface of the base material.

In the present invention, in step C, the embossed holographic water transfer printing film can be formed by either of the following two methods:

Method 1:

This method comprises the following steps: C1. Coating an information layer material on the water soluble film, to form an information layer used to record the holographic pattern; and C2. Transferring the laser holographic pattern on the metal plate onto the information layer by using a mould-pressing machine, to form the embossed holographic water transfer printing film.

The water soluble film has a thickness of 10 µm to 500 µm, and can be any film material suitable for water transfer printing, such as PVA or water transfer paper, etc. The pressing temperature is 100 to 230° C. The information layer has a thickness of 0.01 µm to 100 µm, and the information layer material comprises a main material selected from amino resin, thermosetting acrylic resin, and nitrocellulose and a solvent selected from ethanol, ethyl acetate, and butanone. The weight ratio of the main material to the solvent can be 0.1 to 10.

Method 2:

This method comprises the following steps: C1'. Coating a release layer material and the information layer material on a film in sequence, to form a release layer and an information layer used to record the holographic pattern; C2'. Transferring the laser holographic pattern on the metal plate onto the information layer by using a pressing machine, to form an embossed holographic transfer film; C3'. Forming a reflective layer with a refraction index >2 on the information layer through a vacuum plating process; and C4'. Laminating the embossed holographic transfer film and a water soluble film on a laminating machine, and then releasing the release layer, to obtain an embossed holographic water transfer printing film.

Said film can be any film such as PET (polyethylene terephthalate), PC (polycarbonate), or BOPP (biaxally oriented polypropylene) film, and have a thickness of 10 µm to 500 µm. The release layer has a thickness of 0.01 µm to 100 µm, and the release layer material contains a main material selected from cellulose acetate butyrate and nitrocellulose and a solvent selected from butanone, ethyl acetate, ketone, and ethyl ketone. The weight ratio of the main material to solvent is 0.1 to 10. The information layer has a thickness of 0.01 µm to 100 µm, and the information layer material contains a main material selected from amino resin, thermosetting acrylic resin, and nitrocellulose and a solvent selected from ethanol, ethyl acetate, and butanone. The weight ratio of the main material to the solvent is 0.1 to 10.

The pressing temperature is 100 to 230° C. The reflective layer has a thickness of 0.01 μm to 1 μm, and contains one or more selected from aluminum, titanium, and chromium. The laminating temperature is 20 to 170° C. The water soluble film has a thickness of 10 μm to 500 μm, and can be any film material suitable for water transfer printing, such as PVA, water transfer paper, etc.

In step B, the method for duplicating the laser holographic information on said optical mask plate onto said metal plate comprises the following steps: B1. metallizing the surface of the optical mask plate; and B2. carrying out precision electrotyping on the surface of the metallized optical mask plate, to duplicate the laser holographic information on the photo-sensitive plate onto the metal plate.

In step B1, the process for metallizing is a silver spraying process; and in step B2, the metal plate is a nickel plate having a thickness of 5 μm to 500 μm.

In step B2, the electrotyping method comprises: dipping the metallized optical mask plate into an electrotyping solution as the cathode, dipping the metal for electrotyping into the electrotyping solution as the anode, and connecting the direct power supply.

The electrotyping solution is an aqueous solution containing 0.1-100g/L of boric acid, 0.1-100g/L of nickel chloride and 10-600g/L of nickel sulphamate. The electrotyping is performed under such a condition that the obtained metal plate has a thickness of 5μm to 500μm; for example, the current can be 1 to 100A, and the electrotyping time can be 10 to 1000 min. Before electrotyping, the work-piece can be cleaned with 10-30g/L NaOH solution and passivated in 5-20g/L aqueous solution of potassium dichromate.

In step D, the cubic water transfer printing can be carried out by a traditional cubic water transfer printing process, such as the cubic water transfer printing process described by Yang Yong in "Cubic Water Transfer Printing Process" ("Screen Printing", 2006.6). Cubic printing employs a water soluble film to carry the pattern. Due to its good tensility, the water printing film can be wound on the surface of the base material easily to form a pattern layer, and unique appearance similar to paint coating can be obtained on the surface of the base material. When the film is applied to a surface having a complex shape, the holographic pattern will not deform; in other words, the effect will not be affected.

The method provided in the present invention has the following advantages:

With the method for forming the embossed holographic pattern provided in the present invention, the bonding or soft die pressing procedure can be omitted; and furthermore, the water printing film can be wound on the surface of the base material easily to form a pattern layer, and unique appearance similar to paint coating can be obtained on the surface of the base material. When the film is applied to a surface having a complex shape, the holographic pattern will not deform; in other words, the effect will not be affected. Therefore, the embossed holographic pattern can be transferred to the three-dimensional surface of any work-piece having a complex shape easily, so that a holographic pattern can be formed on the surface of the work-piece, including three-dimensional surfaces of work-pieces having a complex shape, such as inner and outer decorations, and surface of mobile telephone, and large 3-D parts, including dashboard, bumper, bumper shield plate, roof, and even hood shield of car or truck. On one hand, the method for forming die embossed holographic pattern provided in the present invention can substitute painting, printing, hot pressing, and chrome plating process after formation, eliminate the cost of secondary processing, and reduce the cost of coating line and pollution of organic solvents to the environment; and on the other hand, the method for forming die embossed holographic pattern provided in the present invention can form a pattern with good three-dimensional effect, rich colors, and dynamic periscopic effect on the surface, increase the value of the commodity greatly, attract the customers, and deliver great commercial value.

BRIEF DESCRIPTION OF THE DRAWINGS

FIGS. 4A and 4B show forming a protective layer, a reflective layer, a holographic pattern, and an information layer on a base material in one embodiment.

DETAILED DESCRIPTION OF THE PREFERRED EMBODIMENTS

Example 1

Figure 1:
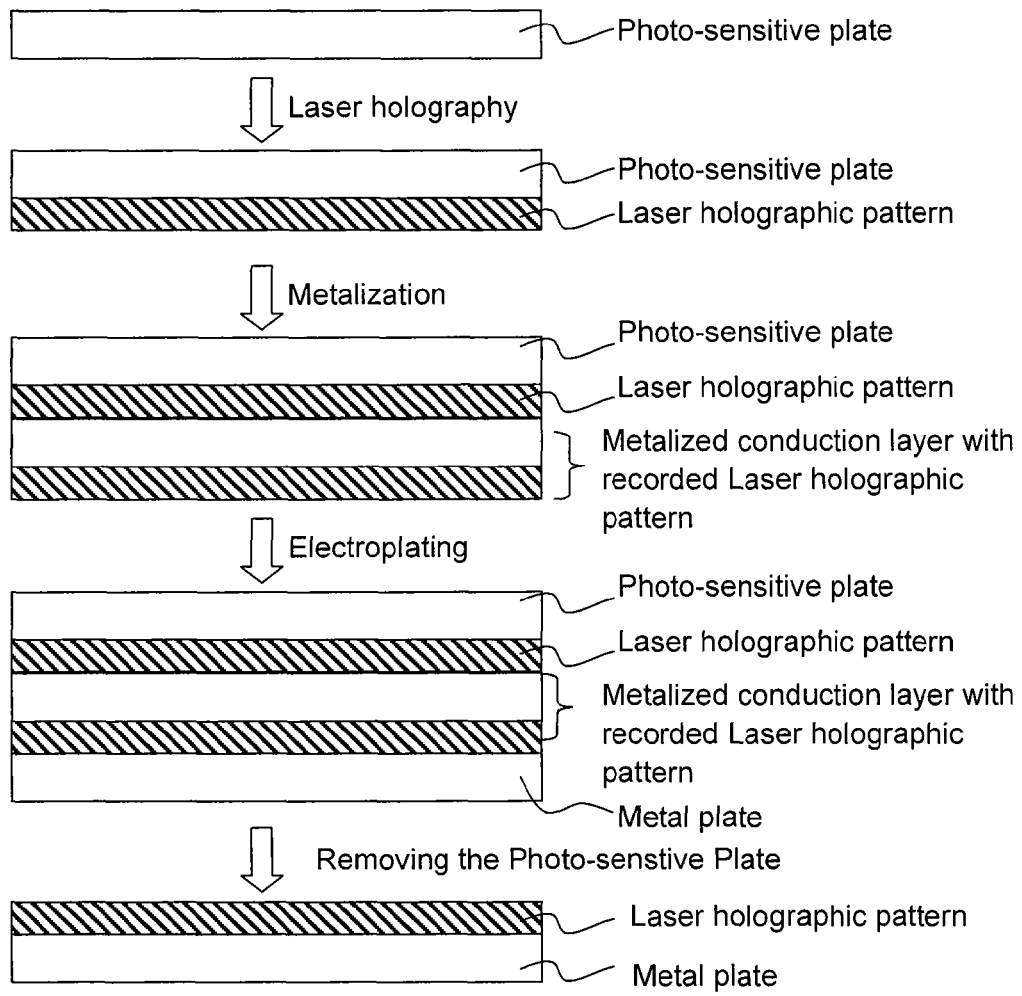
FIG. 1 shows recording a holographic pattern on a photo-sensitive plate and duplicating the holographic pattern on a metal plate in one embodiment.
Figure 2:
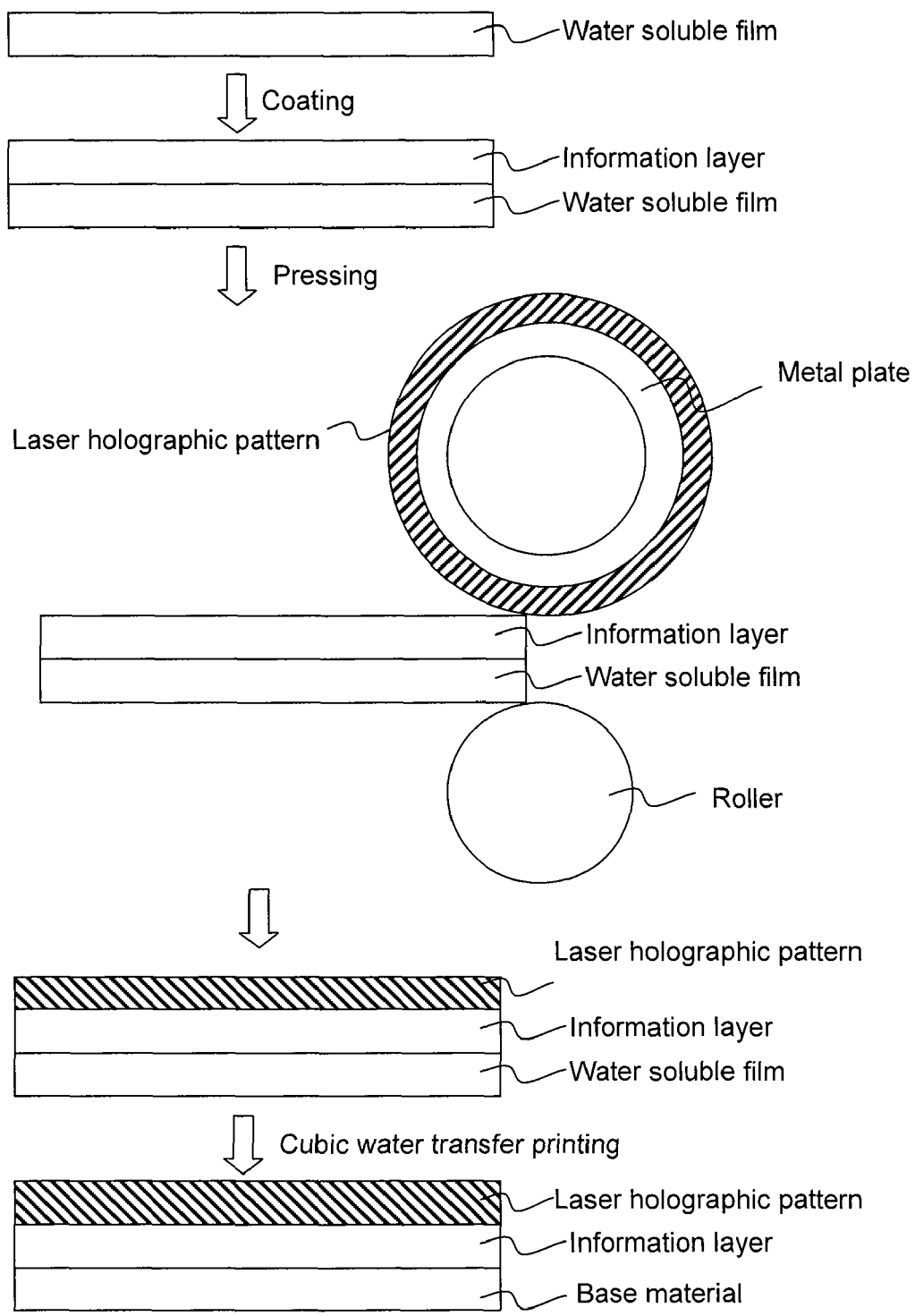
FIG. 2 shows transferring a holographic pattern from the metal plate onto an information layer on a water soluble film and forming the holographic pattern on the surface of a base material in one embodiment.
Figure 3:
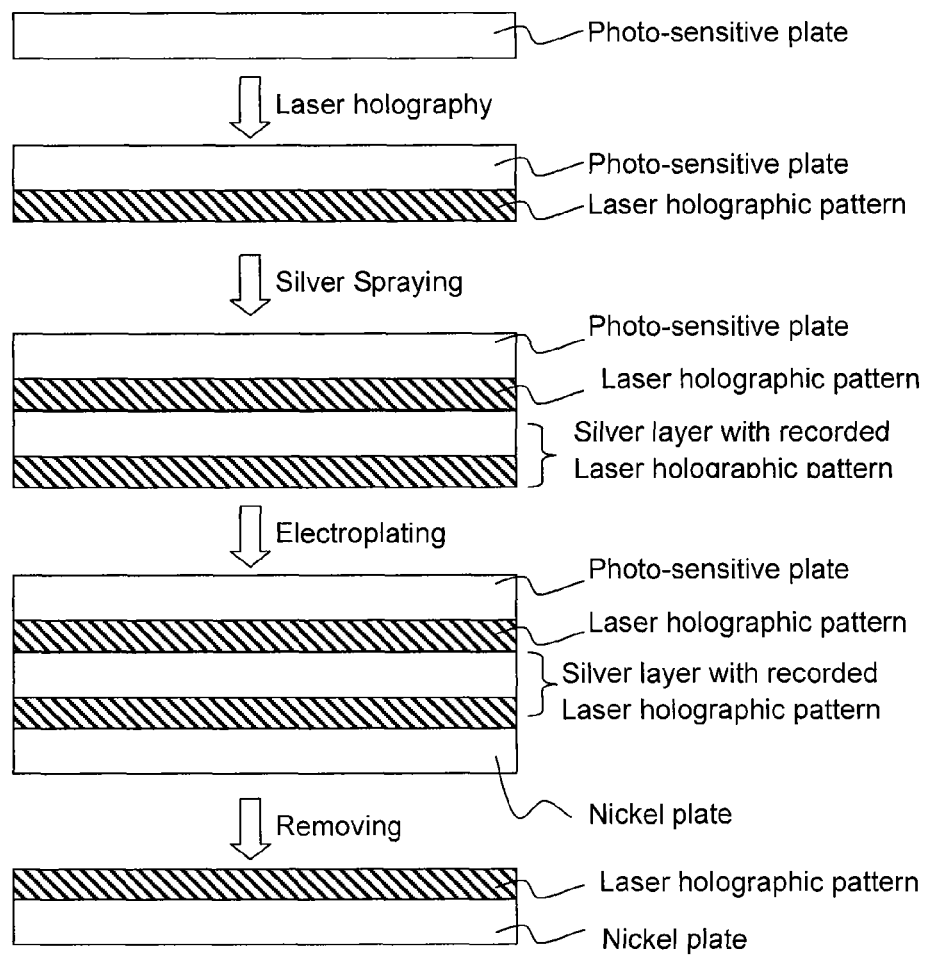
FIG. 3 shows forming a holographic pattern on a nickel plate in one embodiment.
Figure 4A:
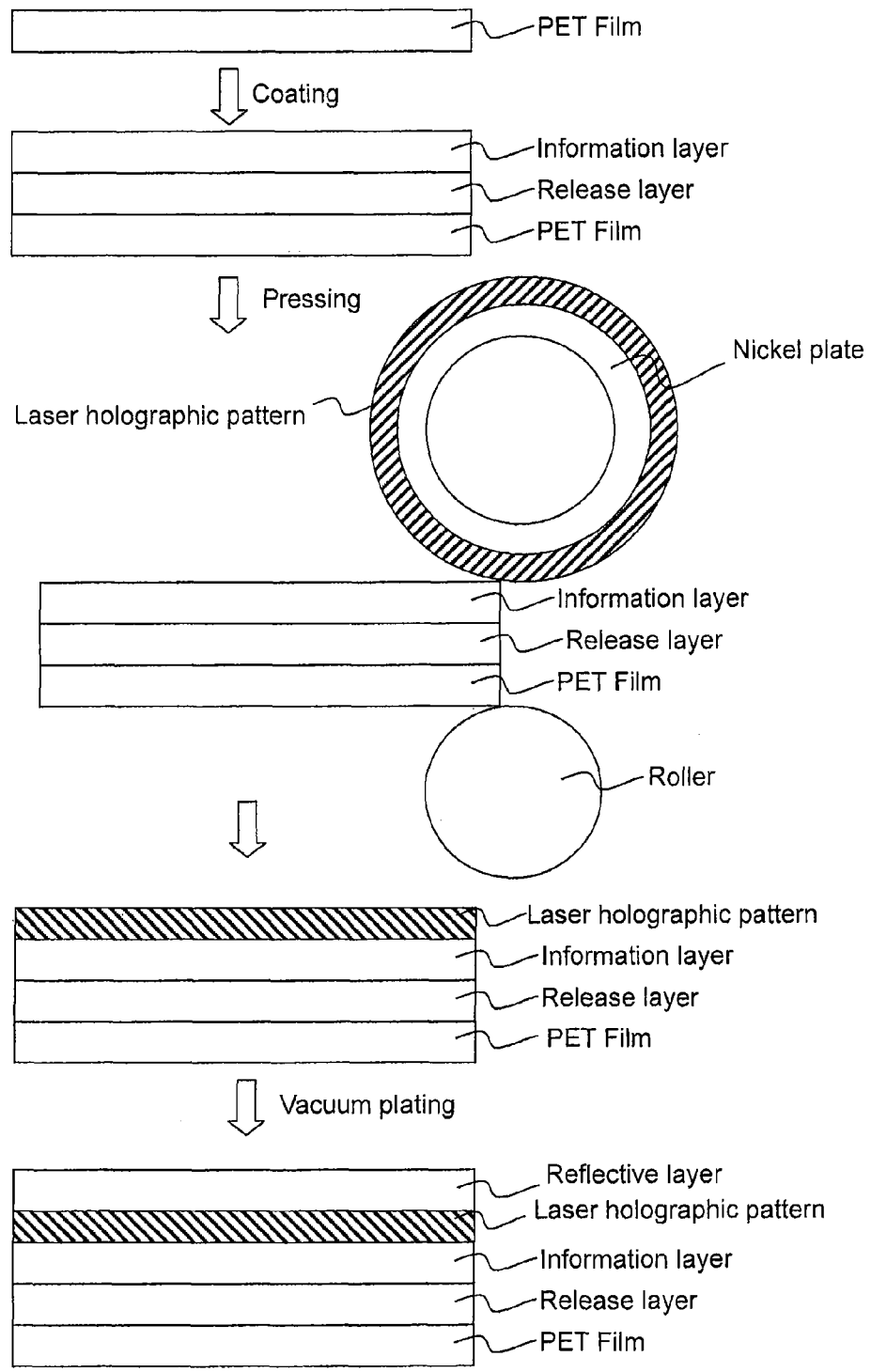

The example is provided to describe the method for forming the embossed holographic pattern according to the present invention. The process was as follows.

1. The pattern required on the surface of the work-piece was designed, and the required pattern was recorded onto a photo-sensitive plate by means of laser holography, to produce the optical mask plate for holographic pattern.

2. To produce the metal plate for holographic pattern: The above optical mask plate was plated with silver, and then precision electrotyping was performed, to duplicate the laser holographic information on the photo-sensitive plate onto the nickel plate which was then coated onto the roller of the pressing machine. The electrotyping procedures was as follows: the metallized optical mask plate was cleaned with 20 g/L NaOH solution, passivated in 10 g/L aqueous solution of potassium dichromate, and then as the cathode dipped into an aqueous solution containing 100 g/l boric acid, 100 g/L nickel chloride, and 200 g/l nickel sulphamate. A nickel plate was used as the anode, and the electrotyping was carried out with a current of 10 A to obtain a nickel plate having a thickness of 50 μm.

These procedures were used to transfer the pattern onto the silver layer after the optical mask plate was metallized through silver spraying, and then the pattern on the silver layer was treated through electrotyping, so as to obtain the pattern on the electrotyped nickel plate. The electrotyping itself was used to add metal material on the surface appropriately according to the designed pattern and form a template ultimately with the added metal material. Therefore, the electrotyping process was also referred to as an addition process.

3. To coat the release layer and information layer: The release layer material and information layer material were coated on a PET film having a thickness of 20 μm in sequence, to form a release layer having a thickness of 2 μm and an information layer having a thickness of 5 μm. The release layer was also referred to as a stripping layer, which would be stripped off later. The release layer material was a mixture of cellulose acetate butyrate and butanone in a weight ratio of 1:1. The information layer material was a mixture of thermosetting acrylic resin and ethanol in a weight ratio of 1:1.

4. To emboss hologram: The laser holographic pattern on the metal plate was transferred onto the information layer on a mould-pressing machine at 180 ° C., to form an embossed holographic transfer film.

5. To vacuum plate a reflective layer: In vacuum state, aluminum was coated on the laser holographic information layer, to form a reflective layer having a thickness of 0.03 µm.

6. To laminate: The embossed holographic transfer film and a polyvinyl alcohol film having a thickness of 18 µm were laminated on a laminating machine at 120° C., and then released, to obtain a holographic water transfer printing film.

7. The cubic printing was carried out on the surface of the work-piece with the embossed holographic printed film, to form an embossed holographic pattern on the surface of the work-piece.

8. A protective layer having a thickness of 4 µm was coated on the surface of the work-piece, to obtain a work-piece with holographic pattern on the surface.

Example 2

The process of the example was as follows:

a. The pattern required on the surface of the work-piece was designed, and the required pattern was recorded onto a photo-sensitive plate by means of laser holography, to produce the optical mask plate for holographic pattern.

b. To produce the metal plate for holographic pattern: The above optical mask plate was sprayed with silver, and then precision electrotyping was performed, to duplicate the laser holographic information on the photo-sensitive plate onto the nickel plate which was then coated onto the roller of the pressing machine. The electrotyping procedures was as follows: the metallized optical mask plate was cleaned with 20g/L NaOH solution, passivated in 10g/L aqueous solution of potassium dichromate, and then as the cathode dipped into the aqueous solution containing 10g/L boric acid, 10g/L nickel chloride, and 50 g/L nickel sulphamate; a nickel plate was used as the anode, and the electrotyping was carried out with a current of 30A to obtain a nickel plate having a thickness of 20µm.

c. To coat the information layer: The information layer material was coated on a piece of water transfer paper having a thickness of 30 µm, to form an information layer having a thickness of 1 µm. The information layer material was a mixture of thermosetting acrylic resin and ethanol in weight ratio of 10:1.

d. To holographic press: The laser holographic pattern on the metal plate was transferred onto the information layer on a mould-pressing machine at 120° C., to form a embossed holographic transfer film.

e. The cubic printing was carried out on the surface of the work-piece with the embossed holographic printed film, to form a embossed holographic pattern on the surface of the work-piece.

f. A protective layer having a thickness of 10µm was coated on the surface of the work-piece to obtain a work-piece with holographic pattern on the surface.

The method according to the present invention is applicable to any base material having complex 3-D shape, such as ABS (Acrylonitrile Butadiene Styrene), PC, PPA (Polyphthalamide), PVC (Polyvinyl Chloride), PU (Polyurethane), PMMA (Polymethyl Methacrylate), wood, metal, alloy, glass, nylon, or porcelain material. Especially, the method for forming the embossed holographic pattern according to the present invention can be used for panels of mobile devices such as mobile telephones and notebook computers and instrument panels on automobiles.

The invention claimed is:

1. A method for forming an embossed holographic pattern, comprising the steps of:
    recording a holographic pattern onto a photo-sensitive plate to produce an optical plate with the holographic pattern;
    duplicating the holographic pattern from the optical plate onto a metal plate to produce a metal plate with the holographic pattern;
    transferring the holographic pattern from the metal plate onto an information layer of a water soluble film to form an embossed holographic water transfer printing film; and
    forming the embossed holographic pattern on the surface of a base material by cubic water transfer printing using the embossed holographic water transfer printing film.

2. The method of claim 1, further comprising a step of:
    forming a protective layer on the surface of the embossed holographic pattern.

3. The method of claim 2, wherein the protective layer has a thickness of between about 0.01 µm and about 100 µm.

4. The method of claim 2, wherein the protective layer comprises an acrylic acid or unsaturated polyester UV coating material.

5. The method of claim 1, wherein the holographic pattern is recorded onto a photo-sensitive plate by means of laser holography.

6. The method of claim 1, further comprising metallizing the surface of the optical plate before the duplicating.

7. The method of claim 6, wherein the metallizing comprises a silver spraying process.

8. The method of claim 6, wherein the metal plate is a nickel plate.

9. The method of claim 8, wherein the nickel plate has a thickness of between about 5 µm and about 500 µm.

10. The method of claim 6, wherein the duplicating comprises precision electrotyping on the surface of the metallized optical plate.

11. The method of claim 10, wherein the precision electrotyping comprises:
    electrotyping the metallized optical plate and the metal plate in an electrotyping solution, wherein the metallized optical mask plate is used as a cathode and the metal plate is used as an anode.

12. The method of claim 11, wherein the electrotyping solution comprises boric acid, nickel chloride, nickel sulphamate, and water.

13. The method of claim 11, wherein the electrotyped metal plate has a thickness of between about 5 µm and about 500 µm.

14. A method for forming an embossed holographic pattern, comprising the steps of:
    recording a holographic pattern onto a photo-sensitive plate to produce an optical plate with the holographic pattern;
    duplicating the holographic pattern from the optical plate onto a metal plate to produce a metal plate with the holographic pattern;
    forming an information layer on a water soluble film;
    transferring the holographic pattern from the metal plate onto the information layer of the water soluble film to form an embossed holographic water transfer printing film; and forming the embossed holographic pattern on the surface of a base material by cubic water transfer printing using the embossed holographic water transfer printing film.

15. The method of claim 14, wherein the water soluble film has a thickness of between about 10 μm and about 500 μm.

16. The method of claim 14, wherein the information layer has a thickness of between about 0.01 μm and about 100 μm.

17. The method of claim 14, wherein the information layer comprises:
- a material selected from the group consisting of amino resin, thermosetting acrylic resin, nitrocellulose, and combinations thereof; and
- a solvent selected from the group consisting of ethanol, ethyl acetate, butanone, and combinations thereof.

18. The method of claim 14, wherein the holographic pattern is transferred from the metal plate onto the information layer of the water soluble film by a pressing machine.

19. The method of claim 18, wherein the pressing temperature is between about 100° C. and about 230° C.

20. A method for forming an embossed holographic pattern, comprising the steps of:
- recording a holographic pattern onto a photo-sensitive plate to produce an optical plate with the holographic pattern;
- duplicating the holographic pattern from the optical plate onto a metal plate to produce a metal plate with the holographic pattern;
- forming a release layer on a film;
- forming an information layer on the release layer;
- transferring the holographic pattern from the metal plate onto the information layer of the film to form an embossed holographic transfer film;
- forming a reflective layer on the information layer of the film;
- laminating the film with a water soluble film;
- removing the release layer to provide an embossed holographic water transfer printing film;
- transferring the holographic pattern from the water transfer printing film onto the surface of a base material.

21. The method of claim 20, wherein the release layer has a thickness of between about 0.01 μm and about 100 μm.

22. The method of claim 20, wherein the information layer has a thickness of between about 0.01 μm and about 100 μm.

23. The method of claim 20, wherein the reflective layer has a thickness of between about 0.01 μm and about 1 μm.

24. The method of claim 20, wherein the release layer comprises:
- a material selected from the group consisting of cellulose acetate butyrate, nitrocellulose, and combinations thereof; and
- a solvent selected from the group consisting of butanone, ethyl acetate, ketone, ethyl ketone, and combinations thereof.

25. The method of claim 20, wherein the reflective layer has a refraction index larger than about 2.

26. The method of claim 20, wherein the reflective layer is formed by a vacuum plating process.

27. The method of claim 20, wherein the laminating temperature is between about 20 and about 170° C.

* * * * *